United States Patent
Amor

(10) Patent No.: US 10,630,712 B2
(45) Date of Patent: Apr. 21, 2020

(54) SAFE AIRCRAFT AVIONICS SYSTEM INTERFACE

(71) Applicant: BAE Systems plc, London (GB)

(72) Inventor: James Richard Amor, Preston (GB)

(73) Assignee: BAE Systems plc, London (GB)

( * ) Notice: Subject to any disclaimer, the term of this patent is extended or adjusted under 35 U.S.C. 154(b) by 173 days.

(21) Appl. No.: 15/575,147

(22) PCT Filed: Jun. 1, 2016

(86) PCT No.: PCT/GB2016/051595
§ 371 (c)(1),
(2) Date: Nov. 17, 2017

(87) PCT Pub. No.: WO2016/193712
PCT Pub. Date: Dec. 8, 2016

(65) Prior Publication Data
US 2018/0146003 A1    May 24, 2018

(30) Foreign Application Priority Data

Jun. 2, 2015  (EP) ..................... 15275145
Jun. 2, 2015  (GB) ..................... 1509506.0

(51) Int. Cl.
*H04L 29/06* (2006.01)
*G06F 9/445* (2018.01)
(Continued)

(52) U.S. Cl.
CPC .......... *H04L 63/1433* (2013.01); *B64D 43/00* (2013.01); *G06F 9/445* (2013.01); *G06F 11/1479* (2013.01)

(58) Field of Classification Search
CPC ... H04L 63/1433; H04L 63/105; B64D 43/00; G06F 11/1479; G06F 9/445; H04B 7/18506
See application file for complete search history.

(56) References Cited

U.S. PATENT DOCUMENTS 6,064,922 A     5/2000  Lee
9,043,938 B1 *  5/2015  Raghu .................... H04L 9/085
                                                    726/28
(Continued)

FOREIGN PATENT DOCUMENTS

EP     2166455 A1     3/2010
EP     2819317 A2    12/2014
WO  2015038435 A1     3/2015

OTHER PUBLICATIONS

International Search Report and Written Opinion of Internation al Application No. PCT/GB2016/051595, dated Aug. 19, 2016, 13 pages.

(Continued)

*Primary Examiner* — Nelson S. Giddins
(74) *Attorney, Agent, or Firm* — Maine Cernota & Rardin

(57) ABSTRACT

Disclosed is an aircraft (102) comprising an aircraft avionics system (108) configured to perform one or more functions, and an interface module (110). The interface module (110) is configured to: store, for each function, respective one or more test criteria; receive, from an entity (104) remote from the aircraft avionics system (108), a function request for the aircraft avionics system (108) to perform a certain function; test the certain function against one or more of the stored test criteria corresponding to the certain function; and, responsive to determining that the certain function satisfies all of the test criteria that correspond to the certain function, outputting the function request for use by the aircraft avionics system (108).

19 Claims, 2 Drawing Sheets

(51) Int. Cl.
    *G06F 11/14*    (2006.01)
    *B64D 43/00*    (2006.01)

(56)            References Cited

U.S. PATENT DOCUMENTS

| | | | |
|---|---|---|---|
| 2008/0075090 A1* | 3/2008 | Farricker | H04L 12/4641 |
| | | | 370/395.53 |
| 2010/0152954 A1* | 6/2010 | Ric | G06F 11/2294 |
| | | | 701/31.4 |
| 2011/0295448 A1 | 12/2011 | Broquet et al. | |
| 2014/0230073 A1 | 8/2014 | Liang | |
| 2015/0005989 A1* | 1/2015 | Beltrand | B64C 19/00 |
| | | | 701/3 |
| 2016/0081008 A1* | 3/2016 | Kuhlmann | H04B 7/18508 |
| | | | 455/552.1 |

OTHER PUBLICATIONS

Havelund Klaus Ed—Hai Jin et al: "Runtime Verification of C Programs", Jun. 10, 2008, Grid and Cooperative Computing—GCC 2004: Third International Conference, Wuhan, China, Oct. 21-24, 2004 In: Lecture Notes in Computer Science, ISSN 0302-9743; vol. 3251.
Great Britain Search Report of Great Britain Application No. GB1509506.0, dated Oct. 21, 2015, 6 pages.
European Search Report of European Application No. EP15275145.9, dated Nov. 18, 2015, 8 pages.
International Preliminary Report on Patentability of International Application No. PCT/GB2016/051595, dated Dec. 5, 2017, 8 pages.

\* cited by examiner

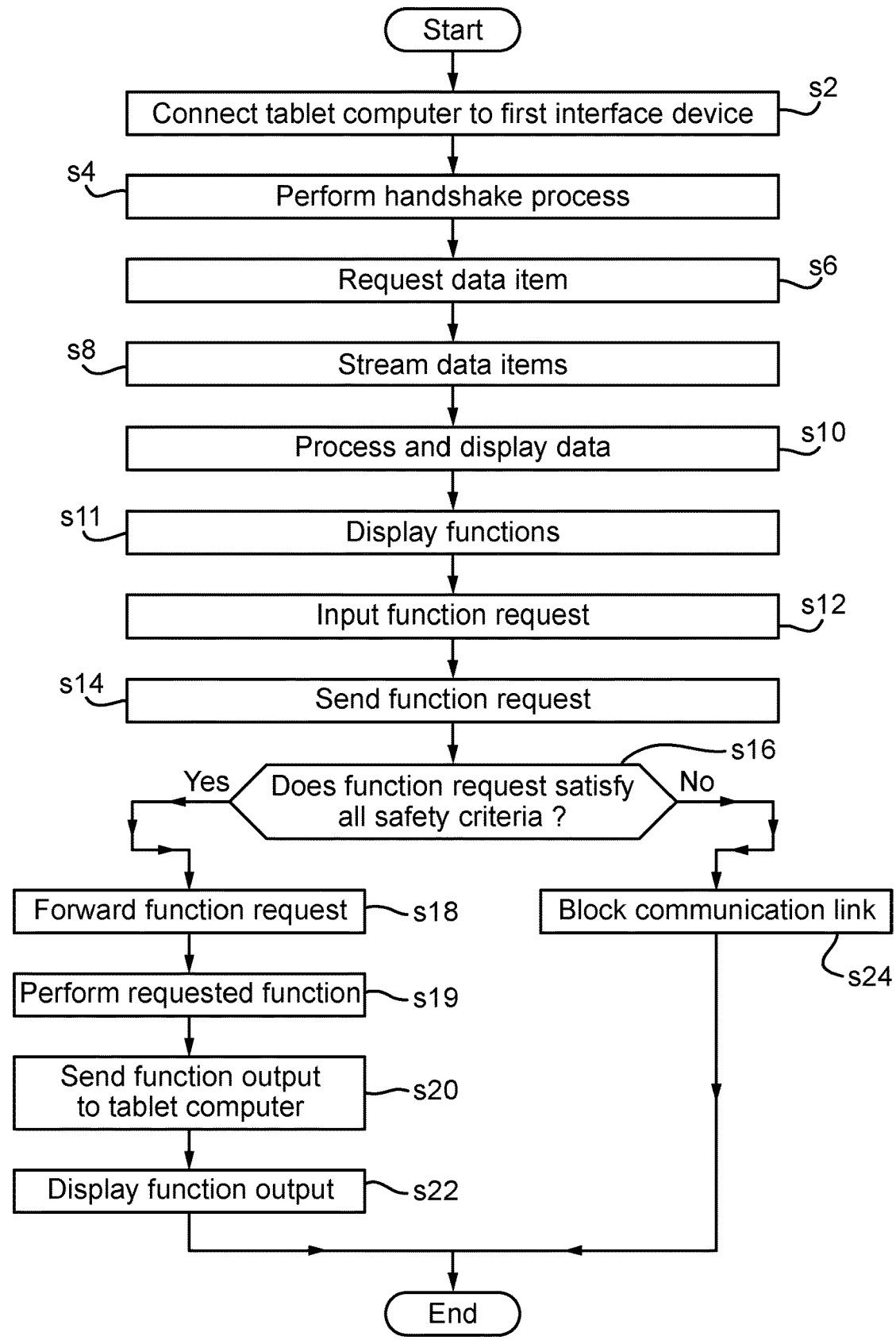

SAFE AIRCRAFT AVIONICS SYSTEM INTERFACE

RELATED APPLICATIONS

This application is a national phase application filed under 35 USC § 371 of PCT Application No. PCT/GB2016/051595 with an International filing date of Jun. 1, 2016 which claims priority of GB Patent Application 1509506.0 filed Jun. 2, 2015 and EP Patent Application 15275145.9 filed Jun. 2, 2015. Each of these applications is herein incorporated by reference in its entirety for all purposes.

FIELD OF THE INVENTION

The present invention relates to aircraft avionics system and interfaces therewith.

BACKGROUND

Aircraft avionics systems include sensors, communication systems, and navigation systems that may be used during the operation of the aircraft (e.g. inflight), and for maintenance of the aircraft. Typically aircraft avionics systems are closed systems which do not permit operators from using non-integrated electronics to communicate with the avionics system. For example, an aircraft avionics system may be qualified with respect to stringent reliability, safety and security regulations.

Many aircraft operators would like to use non-qualified, commercially available computing devices, such as tablet computers, to interface with the aircraft avionics system.

SUMMARY OF THE INVENTION

In a first aspect, the present invention provides an aircraft comprising an aircraft avionics system configured to perform one or more functions, and an interface module. The interface module is configured to: store, for each function, respective one or more test criteria; receive, from an entity remote from the aircraft avionics system, a function request for the avionics system to perform a certain function; test the certain function against one or more of the stored test criteria corresponding to the certain function; and, responsive to determining that the certain function satisfies all of the test criteria that correspond to the certain function, outputting the function request for use by the aircraft avionics system.

The interface module may be further configured to, responsive to determining that the certain function does not satisfies at least one of the test criteria that correspond to the certain function, prevent the function request from being sent to the aircraft avionics system The interface module may be further configured to, responsive to determining that the certain function does not satisfies at least one of the test criteria that correspond to the certain function, close (i.e. sever) a communication link between the interface module and the entity remote from the aircraft avionics system.

The interface module may be further configured to, responsive to determining that the certain function does correspond to at least one of the test criteria, prevent the function request from being sent to the aircraft avionics system.

The aircraft avionics system may be configured to perform the certain function specified in the function request output by the interface module, thereby generating an avionics system output. The interface module may be configured to output, for use by the entity remote from the aircraft avionics system, the avionics system output.

The interface module may be further configured to establish a communications link with the entity that is remote from the avionics system. The interface module may be further configured to perform a handshaking process with the entity that is remote from the avionics system including acquiring one or more connection criteria for the entity. The interface module may be further configured to, while the communication link between the interface module and the entity is established (i.e. continuously or intermittently for the duration of the link), test communications between the interface module and the entity against the one or more connection criteria for the entity. The interface module may be further configured to, responsive to determining that the communications between the interface module and the entity satisfy all of the connection criteria for the entity, maintain the communication link between the interface module and the entity.

The interface module may be further configured to, responsive to determining that the communications between the interface module and the entity do not satisfy at least one of the connection criteria for the entity, prevent communications from the entity from being sent to the aircraft avionics system.

The interface module may be further configured to, responsive to determining that the communications between the interface module and the entity do not satisfy at least one of the connection criteria for the entity, close the communication link between the interface module and the entity.

The handshaking process between the interface module and the entity may include the interface module providing information that specifies the one or more functions performable by the aircraft avionics system for use by the entity.

In a further aspect, the present invention provides a system comprising an aircraft according to any preceding aspect, and the entity remote from the aircraft avionics system. The entity is configured to send, to the interface module, the function request for the avionics system to perform the certain function.

The entity may be remote from the aircraft.

The entity may be a computer selected from the group of computers consisting of a mobile communication device, a desktop personal computer, a laptop computer, a tablet computer, a mobile station, a wireless phone, a smartphone, a netbook, and dedicated aircraft computing hardware.

In a further aspect, the present invention provides a data communication method performed by an aircraft. The aircraft comprising an aircraft avionics system configured to perform one or more functions, and an interface module operatively coupled to the aircraft avionics system. The method comprises: storing on the aircraft, for each function, respective one or more test criteria; receiving, by the interface module, from an entity remote from the aircraft avionics system, a function request for the avionics system to perform a certain function; testing, by the interface module, the certain function against one or more of the stored test criteria corresponding to the certain function; and, responsive to determining that the certain function satisfies all of the test criteria that correspond to the certain function, outputting, by the interface module, the function request for use by the aircraft avionics system.

In a further aspect, the present invention provides a program or plurality of programs arranged such that when executed by a computer system or one or more processors it/they cause the computer system or the one or more processors to operate in accordance with the method of the preceding aspect.

In a further aspect, the present invention provides a machine readable storage medium storing a program or at least one of the plurality of programs according the preceding aspect.

BRIEF DESCRIPTION OF THE DRAWINGS

FIG. 2 is a process flow chart showing certain steps of a method of communication implemented by the system.

DETAILED DESCRIPTION

Figure 1:
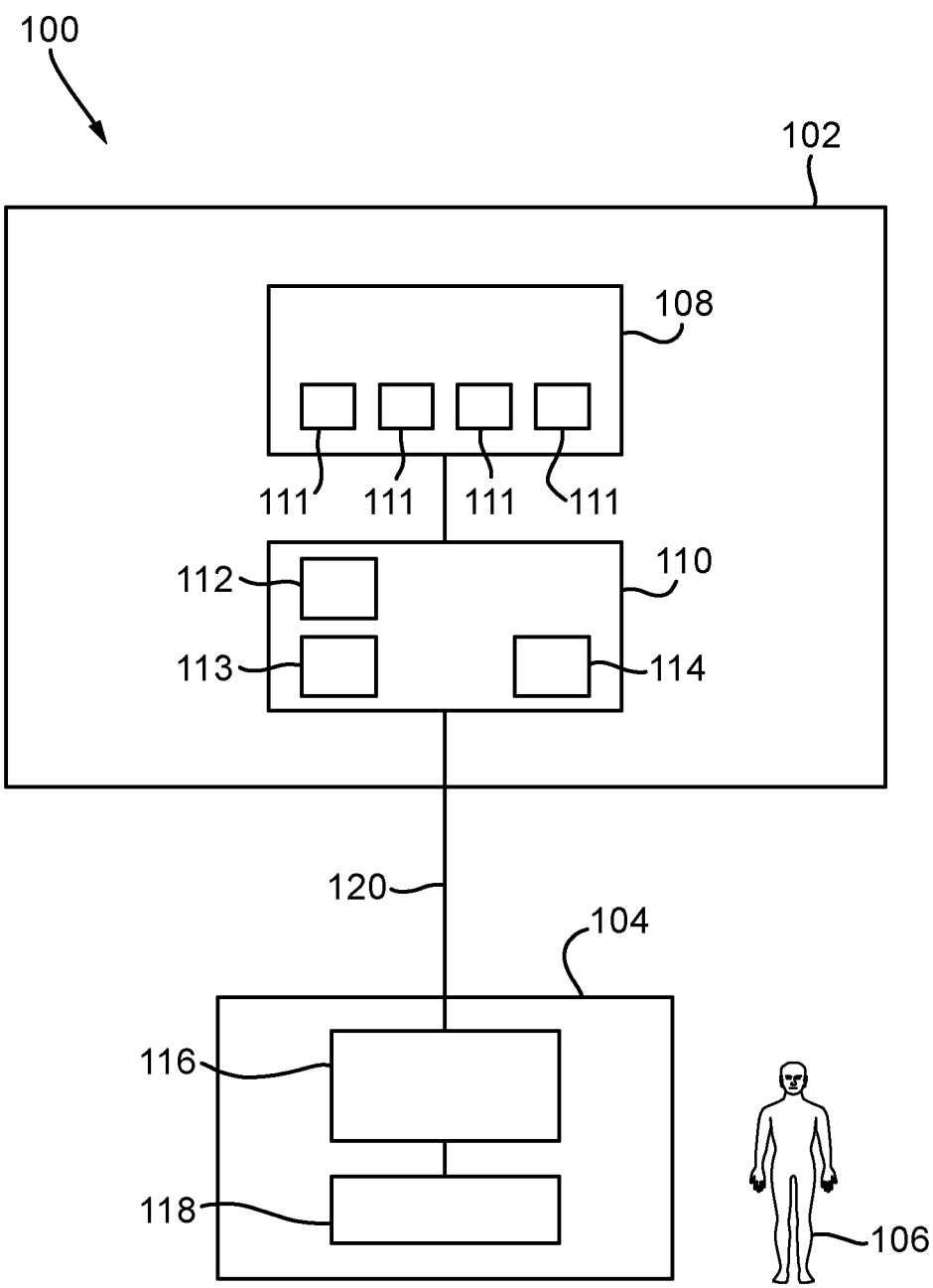
FIG. 1 is a schematic illustration (not to scale) of a system comprising an aircraft avionics system and interface thereto.

FIG. 1 is a schematic illustration (not to scale) of a system 100 in which an embodiment of an aircraft avionics system and interface thereto is shown.

The system 100 comprises an aircraft 102, a tablet computer 104, and a human user 106.

The aircraft 102 may be any appropriate type of aircraft. The aircraft 102 comprises an aircraft avionics system 108 and a first interface module 110.

In this embodiment, the aircraft avionics system 108 comprises inter alia multiple sensors, communications systems, and navigation systems, which are hereinafter collectively referred to as "avionics modules" and are indicated in FIG. 1 by a plurality of boxes and the reference numeral 111. The avionics modules 111 may be operatively connected together. The aircraft avionics system 108 is implemented in hardware and software that has been qualified with respect to one or more predetermined reliability, safety, and/or security standards.

The aircraft avionics system 108 is coupled to the first interface module 110 such that signals may be sent between the aircraft avionics system 108 and the first interface module 110. For example, as described in more detail later, in operation one or more avionics modules 111 of the aircraft avionics system 108 provide data to the first interface module 110. Also, the first interface module 110 may send control signals or instruction signals to one or more of the avionics modules 111 of the aircraft avionics system 108.

In this embodiment, in addition to being connected to the aircraft avionics system 108, the first interface module 110 is connected to the tablet computer 104 such that information may be sent between the first interface module 110 and the tablet computer 104.

The first interface module 110 acts as a partition, i.e. a gateway or firewall, between the aircraft avionics system 108 and the tablet 104.

The first interface module 110 may be provided as software running in one or more processors located on board the aircraft 102, for example on one or more of the avionics modules 111. In this embodiment, the first interface module 110 is implemented in hardware and software that has been qualified with respect to the same one or more predetermined reliability, safety, and/or security standards to which the avionics system conforms.

The first interface module 110 comprises a first database 112, a second database 113, and a third database 114.

The first database 112 comprises a list of functions or operations performable by the aircraft avionics system 108. For example, a function listed in the first database 112 may specify an operation that may be performed by a single avionics module 111, or cooperatively by a group of avionic modules 111. For example, the first database may include a route planning function for determining a route for the aircraft 102 between two specified waypoints. This route planning function may be performable by one or more avionics modules 111 of the aircraft avionics system 108 including, for example, a navigation system, an orientation sensor, a speed sensor, and an altitude sensor.

The second data base 113 comprises, for each of the functions listed in the first database 112, one or more criteria, each of which is hereinafter referred to as a "function criterion". The function criteria will be described in more detail later below with reference to FIG. 2. Each function criterion for a function specifies how that function is to be used. For example, a function criterion for a particular function may specify that that function may not be called or requested more frequently than once per second.

The third data base 114 comprises, for each device or other module connected to the first interface module 110, one or more criteria, each of which is hereinafter referred to as a "connection criterion". In this embodiment, the third database 114 includes one or more connection criteria for the tablet computer 104. Also, in some embodiments, the third database 114 includes one or more connection criteria for one or more of the avionics modules 111. The connection criteria will be described in more detail later below with reference to FIG. 2. Each connection criterion for a device connected to the first interface module 110 is a criterion that is to be fulfilled in order for that connection between the first interface module 110 and the connecting device to remain established. Each connection criterion for a device connected to the first interface module 110 is a criterion that is to be fulfilled by that connecting device, the first interface 110, and/or the connection between the first interface 110 and that connecting device. For example, a connection criterion for a device connected to the first interface module 110 may specify that a health status message must be received by the first interface module 110 from the connecting device 104 every 250 ms in order for the connection between the first interface module 110 and that connecting device to be maintained. Thus the connection is tested continuously or intermittently for the duration of the connection.

The tablet computer 104 comprises a second interface module 116 and a touchscreen display 118.

In this embodiment, the second interface module 116 is coupled to the first interface module 110, via a wired or wireless communications link, such that signals may be sent between the interface modules 110, 116. The connection between the first and second interface modules 110, 116 is hereinafter referred to as the "communications link" and is indicated in FIG. 1 by the reference numeral 120. The communications link 120 may be any appropriate type of communications link including, but not limited to, a WiFi link, a Bluetooth link, an Ethernet link (which may, for example, utilise the Internet Protocol), and a serial link.

In addition to being connected to the first interface module 110. The second interface module 116 is connected to the touch screen display 118 such that signals may be sent between the second interface module 116 and the touch screen display 118.

The second interface module 116 may be provided as software running in one or more processors located in the tablet computer 104.

The second interface module 116 is configured to process information received from the first interface module 110, and display that processed information to the user 106 on the touchscreen display 118.

The touchscreen display 118 is configured to display information received from the second interface module 116 to the user 106. The touchscreen display 118 is further configured to receive a user input from the user 106, for example, as a touch gesture. The touchscreen display 118 is configured to send a signal corresponding to the received user input to the second interface module 116. Thus, the user 106 may input requests, instructions, and/or other information into the tablet computer 104.

Apparatus, including the interface modules 110, 116, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 2 is a process flow chart showing certain steps of a method of communication implemented by the system 100.

At step s2, the second interface module 116 connects to the first interface module 110. The user 106 may operate the tablet computer 104 using the touchscreen display 118 to cause the second interface module 116 to connect with to the first interface module 110. Thus, the communications link 120 is established. In some embodiments, the communication link 120 is established automatically at system start-up, for example, without input from the user 106.

At step s4, the first and second interface modules 110, 116 perform a hand-shaking process via the communications link 120.

In this embodiment, the handshaking process is an automated process of negotiation between the first and second interface modules 110, 116 that dynamically sets parameters of the communications link 120 established between those two entities. The handshaking process between the first and second interface modules 110, 116 may include the determination of the latest version of communication software that is common to both the first and second interface modules 110, 116. The communication parameters set for the communication link 120 by the handshaking process may be dependent upon the latest version of communication software that is common to both the first and second interface modules 110, 116.

In this embodiment, the handshaking process between the first and second interface module 110, 116 includes setting the connection criteria for the tablet computer 104. The connection criteria for the tablet computer 104 established by the handshaking process are stored in the third database 114 of the first interface module 110. The connection criteria for the tablet computer 104 are criteria that must be fulfilled in order for the communication link 120 between the first interface module 110 and the second interface module 120 to remain established.

The handshaking process may set communication parameters including, but not limited to, information transfer rate, encoding, and any other protocol or hardware features. The connection criteria may, for example, be criteria for one or more of the communication parameters.

In this embodiment, throughout the performance of the remainder of the process of FIG. 2, i.e. during the performance of steps s6 to s24, the connection criteria for the tablet computer 104 that are set during the handshaking process of step s4 and stored in the third database 114 are tested by the first interface module 110 to ensure that each of those connection criteria is satisfied. For example, for a connection criterion that specifies that a health status message must be received by the first interface module 110 from the tablet computer 104 at least every 250 ms, the first interface module 110 will test every 250 ms whether or not a new health status message has been received by the first interface module 110 from the tablet computer 104.

In this embodiment, if all connection criteria for the tablet computer 104 stored within the third database 114 are satisfied, then the first interface module 110 maintains the communication link 120. However, if at any point during the performance of steps s6 to s24, the first interface module 110 determines that one or more of the connection criteria for the tablet computer 104 is not satisfied, the first interface module 110 blocks the communication between the tablet computer 104 and the aircraft avionics system 108. In particular, the first interface module 110 prevents signals being sent from the tablet 104 to the aircraft avionics module 108 and vice versa.

By determining that one or more connection criteria for the tablet computer 104 are not satisfied, the first interface module 110 determines that there is a risk that operation of the tablet computer 104 may cause one or more of the avionics modules 111 to operate outside of the one or more predetermined reliability, safety, and/or security standards to which the avionics system 108 currently conforms. Thus, by preventing signals being sent between the aircraft avionics system 108 and the tablet computer 104, the first interface module 110 minimises or eliminates a chance of the aircraft avionics system 108 being operated outside of its declared clearances.

In some embodiments, in response to the first interface module 110 determining that one or more connection criteria for the tablet computer 104 are not satisfied, the first interface module 110 severs (i.e. breaks or closes) the communication link 120. Thus, all communication between the aircraft avionics system 108 and the tablet computer 104 is stopped until, for example, a reset process is performed and the handshaking process is re-performed. An interval may be imposed by the system between severing the communication link 120 and initiating the reset process and re-performing the handshaking process.

At step s6, the second interface module 116 sends a request for data items to the first interface module 110 via the communication link 120.

In this embodiment, the request for data items is sent responsive to the completion of the handshaking process between the interface modules 110, 116. However, in other embodiments, the sending of the request for data items is triggered in a different way, for example, in some embodiments the user 106 inputs, using the touchscreen display 118, a list of data items, and the second interface module sends a request for those listed data items to the first interface module 110.

At step s8, the first interface module 110 acquires the requested data items from the aircraft avionics system 108, and sends those data items to the second interface module 116 via the communications link 120. In some embodiments, the transmission of data items from the aircraft avionics system 108 to the second interface module 116 is a continuous process. For example, the data items may be continuously transmitted at a requested rate until a request to stop is transmitted from the tablet computer 104 to the aircraft avionics system 108.

Output of data items by the avionics modules 111 of the aircraft avionics system 108 is normal operation of those avionics modules 111. Streaming of the data items from the first interface module 110 to the second interface module 116 is independent of and separate to the operation of the aircraft avionics system 108. Thus, the sending (e.g. streaming) of data items from the avionics system 108 to the tablet computer 104 is performed in a way that maintains the conformity of the aircraft avionics system 108 with the one or more predetermined reliability, safety, and/or security standards.

At step s10, the second interface module 116 process the received data items and displays, on the touchscreen display 118, the processed data items to the user 106.

At step s11, the second interface module 116 acquires the list of the functions or operations performable by the aircraft avionics system 108, and displays, on the touchscreen display 118, those functions to the user 106. In other words, the touchscreen display 118 displays to the user 106 the functions that are stored in the first database 112. In some embodiments, the list of functions is stored in a memory of the tablet 104 and is acquired by the second interface module 116 from that local memory. In some embodiments, the second interface module 116 acquires the list of functions from an entity remote from the tablet computer 104, for example by downloading the list of functions from the first interface module 110 using the communications link 120, or from a remote server via the Internet. In some embodiments, a different interface is displayed on the touchscreen display 118 instead of or in addition to the list of functions, for example an interface that utilises the underlying functions may be displayed.

At step s12, based on the displayed data items, the user 106 selects, using the touchscreen display 118, a function to be performed by the aircraft avionics system 108. For example, the user 106 may, based on displayed navigation data, select that the aircraft avionics system 108 calculate a waypoint for the aircraft 102, which may be for performance by a navigation system of the aircraft 102. The second interface module 116 generates a function request corresponding to the function selected by the user 106.

At step s14, the second interface module 116 sends the function request to the first interface module 110 via the communication link 120.

At step s16, the first interface module 110 determines whether or not the received function request satisfies each of the function criteria corresponding to that selected function that are stored within the second data base 113. For example, if a function criterion for the selected function specifies that the selected function may not be called or requested more frequently than once per second, the first interface module 110 checks that the selected function has not been previously requested in the previous second.

If, at step s16, the first interface module 110 determines that each of the function criteria corresponding to the requested function is satisfied by the received function request, the process of FIG. 2 proceeds to steps s18.

If, at step s16, the first interface module 110 determines that at least one of the function criteria corresponding to the requested function is not satisfied by the received function request, the process of FIG. 2 proceeds to steps s24. Step s24 will be described in more detail later below after a description of steps s18 to s22.

In this embodiment, if the first interface module 110 determines that the received function request corresponds to an unrecognised function, i.e. to a function for which there are no corresponding function criteria stored in the second database 113, the process of FIG. 2 proceeds to steps s24.

Thus, the first interface module 110 checks whether or not the performing of the requested function by the avionics system 108 would cause one or more of the avionics modules 111 to operate outside of the one or more predetermined reliability, safety, and/or security standards to which the aircraft avionics system 108 conforms.

At step s18, responsive to determining that all function criteria corresponding to the requested function are satisfied by the received function request, the first interface module 110 forwards the received function request to the avionics system 108. Thus, only functions that do not cause any of the avionics modules 111 to operate outside of the one or more predetermined reliability, safety, and/or security standards are requested.

At step s19, the aircraft avionics system 108 performs the requested function.

In some embodiments, the first interface module 110 does not relay the function request to the aircraft avionics system 108 and instead may control the aircraft avionics system 108 to perform the requested function.

At step s20, an output of the aircraft avionics system 108 resulting from the aircraft avionics system 108 performing the requested function is sent from the aircraft avionics system to the second interface module 116 of the tablet computer 104 via the first interface module 110 and the communications link 120.

In some embodiments, the output of the aircraft avionics system 108 is data computed by performing the requested function. In some embodiments, the output of the aircraft avionics system 108 is an acknowledgment that the requested function has been received and/or performed. In some embodiments, the aircraft avionics system 108 does not produce an output when it performs the requested function.

The performing of the requested function by the avionics modules 111 of the aircraft avionics system 108 tends to be normal operation of those avionics modules 111, as ensured by the testing of the function request against the function criteria. The sending of the function output from the first interface module 110 to the second interface module 116 is independent of and separate to the operation of the aircraft avionics system 108. Thus, the sending of the function output from the aircraft avionics system 108 to the tablet computer 104 is performed in a way that maintains the conformity of the aircraft avionics system 108 with the one or more predetermined reliability, safety, and/or security standards.

At step s22, the second interface module 116 process the received function output and displays, on the touchscreen display 118, the function output to the user 106.

After step s22, the process of FIG. 2 ends. In some embodiments, the process may return to a previous step, for example, step s10.

Returning to the case where, at step s16, the first interface module 110 determines that one or more function criteria corresponding to the requested function are not satisfied by the received function request, at step s24, the first interface module 110 blocks the communication between the tablet computer 104 and the aircraft avionics system 108. In particular, the first interface module 110 prevents the function request from being sent to the aircraft avionics system 108.

By determining that one or more function criteria corresponding to the requested function are not satisfied by the received function request, the first interface module 110 determines that there is a risk that requesting the aircraft avionics system 108 to perform the requested function may cause one or more of the avionics modules 111 to operate outside of the one or more predetermined reliability, safety, and/or security standards to which the avionics system 108 currently conforms. Thus, by preventing the aircraft avionics system 108 from receiving function requests that do not satisfy all relevant function criteria, the first interface module 110 minimises or eliminates a chance of the aircraft avionics system 108 being operated outside of its declared clearances.

In some embodiments, in response to the first interface module 110 determining that one or more function criteria corresponding to the requested function are not satisfied by the received function request, the first interface module 110 severs (i.e. breaks or closes) the communication link 120. Thus, all communication between the aircraft avionics system 108 and the tablet computer 104 is stopped until, for example, a reset process is performed and the handshaking process is re-performed. This severing of the communication link 120 may be performed instead of or in addition to the first interface module 110 blocking the communication between the tablet computer 104 and the aircraft avionics system 108.

After step s24, the process of FIG. 2 ends.

Thus, a method of communication implemented by the system 100 is provided.

The above described system advantageously tends to provide that aircraft operators may use commercially available tablet computers to receive data from the aircraft avionics system, and send function requests or other data to the aircraft avionics system, without requiring the tablet computers to be certified devices, i.e. without requiring that the tablet computers have been qualified with respect to the same one or more predetermined reliability, safety, and/or security standards to which the aircraft avionics system conforms.

Advantageously, the signals from an uncertified source that may cause the avionics system to operate outside of its qualification tend to be prevented from being sent to the aircraft avionics system. Thus, the integrity of the aircraft avionics system tends to be maintained.

The above described system advantageously tends to avoid having to qualify the tablet computer, or another device that connects to the first interface module, with respect to the one or more predetermined reliability, safety, and/or security standards to which the aircraft avionics system conforms. Furthermore, end-to-end integration testing, for example when the tablet computer software or the first interface module software is modified, tends to be avoided. The aircraft avionics system is advantageously independent of the interface modules.

Advantageously, the function criteria stored in the first interface module may be easily modified to account for modifications to the aircraft avionics system.

The above described system is advantageously useable for both inflight operations as well as maintenance functions. For example, the system can be used for storing flight log data, pilot reports, aircraft fault isolation applications, aircraft troubleshooting, moving map applications, and administrative communications functions. In some embodiments, the tablet computer may be inside an aircraft (e.g. in the aircraft cockpit), for example, while the aircraft is inflight to control the aircraft.

Advantageously, the agility of the tablet computer tends to be maintained, while also allowing operation of the tablet computer with the aircraft avionics system. Thus, the tablet computer is free to perform software updates and include new software without having to undergo qualification with respect to the avionics system certification. The first interface module screens communications between the avionics system and the tablet computer.

The function criteria used by the first interface device are dependent upon the avionics modules present in the aircraft avionics system. Thus, in effect, the first interface device is "aware" of the system composition of the aircraft avionics system. The rules and criteria enforced by the first interface module are based on the operation and capabilities of the aircraft avionics system. If an avionics module is changed for a different avionics module, updated, or removed from the aircraft avionics system, the function criteria and/or the connection criteria implemented by the first interface device may be updated accordingly. This tends not to require changes to the made to the software of the tablet computer. Thus, the system is advantageously flexible.

Advantageously, the tablet computer only communicates directly with the first interface module. Thus, the tablet computer is effectively "blind" to the aircraft avionics system. Thus, the tablet computer, including the second interface module, may be used to communicate with multiple different aircraft, each of which may include aircraft avionics systems having different compositions, and different first interface devices implementing different sets of rules/criteria.

Advantageously, the first interface module may perform functions involving multiple avionics modules, thereby leveraging additional capability from the avionics modules.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the first interface module controls data flow to and from the aircraft avionics system. However, in other embodiments, the first interface module controls data flow to and/or from a different system instead of or in addition to the aircraft avionics system such as a different aircraft subsystem, for example, an aircraft propulsion system.

In the above embodiments, a single tablet computer is connected to the aircraft and data is passed between the aircraft and that tablet computer. However, in other embodiments, multiple tablet computers are used, either simultaneously or in series. In some embodiments, a different device is used instead of or in addition to one or more of the tablet computers. Preferably portable (e.g. hand-held) communication devices are used. Any appropriate type of computer may be used. Examples of devices that may be used instead of or in addition to a tablet computer include, but are not limited to, a desktop personal computer, a laptop computer, a tablet computer, a mobile station, a wireless phone, a smartphone, a netbook, etc.

In the above embodiments, the entity or device (which for example is a single tablet computer), is wholly contained within, or wholly on board the aircraft. In particular the entity or device is within the cockpit of the plane and accessible and operable by the pilot.

Typically the entity or device, once in the cockpit will form a communications link with only the systems onboard or within the aircraft. For instance, the entity may communicate with only the on-board avionics systems.

In the above embodiments, at step s6, the second interface module sends a request for data items to the first interface module via the communication link. In some embodiments, the first interface module tests these requests for data against one or more of the stored criteria. The first interface module may permit the data requests if all relevant criteria are satisfied. Also, the first interface module may block the requests and/or sever the communication link if one or more of the relevant criteria are not met by the data requests.

What is claimed is:

1. An aircraft comprising:
   an aircraft avionics system configured to perform one or more functions; and
   an interface module configured while the aircraft is in flight to:
     store, for each of the functions, respective one or more test criteria;
     receive, from an entity remote from the aircraft avionics system, a function request for the aircraft avionics system to perform a certain one of the functions;
     test the certain function against one or more of the stored test criteria corresponding to the certain function;
     responsive to determining that the certain function satisfies all of the test criteria that correspond to the certain function, output the function request for use by the aircraft avionics system; and
     responsive to determining that the certain function does not satisfy at least one of the test criteria that correspond to the certain function, close a communication link between the interface module and the entity remote from the aircraft avionics system.

2. The aircraft according to claim 1, wherein the interface module is further configured to, responsive to determining that the certain function does not satisfy at least one of the test criteria that correspond to the certain function, prevent the function request from being sent to the aircraft avionics system.

3. The aircraft according to claim 1, wherein the interface module is further configured to, responsive to determining that the certain function does correspond to at least one of the test criteria, prevent the function request from being sent to the aircraft avionics system.

4. The aircraft according to claim 1, wherein:
   the aircraft avionics system is configured to perform the certain function specified in the function request output by the interface module, thereby generating an avionics system output; and
   the interface module is configured to output, for use by the entity remote from the aircraft avionics system, the avionics system output.

5. The aircraft according to claim 1, wherein the interface module is further configured to:
   establish a communications link with the entity that is remote from the aircraft avionics system;
   perform a handshaking process with the entity that is remote from the aircraft avionics system, said handshake including acquiring one or more connection criteria for the entity;
   while the communication link between the interface module and the entity is established, test communications between the interface module and the entity against the one or more connection criteria for the entity; and
   responsive to determining that the communications between the interface module and the entity satisfy all of the connection criteria for the entity, maintain the communication link between the interface module and the entity.

6. The aircraft according to claim 5, wherein the interface module is further configured to, responsive to determining that the communications between the interface module and the entity do not satisfy at least one of the connection criteria for the entity, prevent communications from the entity from being sent to the aircraft avionics system.

7. The aircraft according to claim 5, wherein the handshaking process between the interface module and the entity includes the interface module providing information that specifies the one or more functions performable by the aircraft avionics system for use by the entity.

8. The aircraft according to claim 5, wherein the interface module is further configured to, responsive to determining that the communications between the interface module and the entity do not satisfy at least one of the connection criteria for the entity, close the communication link between the interface module and the entity.

9. The aircraft according to claim 8, wherein the interface module is further configured to, responsive to closing the communication link between the interface module and the entity, re-perform the handshaking process.

10. The aircraft according to claim 1, wherein the entity is wholly contained within or wholly on board the aircraft.

11. The aircraft of claim 1, wherein the interface module is configured to:
    receive from the entity remote from the aircraft avionics system a request for data items;
    acquire the requested data items from the avionics system; and
    continuously stream the requested data items to the entity remote from the aircraft avionics system at a requested rate until a request to stop is received from the entity remote from the avionics system.

12. A system comprising:
    an aircraft according to claim 1; and
    an entity remote from the aircraft avionics system, said entity being configured to send to the interface module a function request for the aircraft avionics system to perform a certain function.

13. The system according to claim 12, wherein:
    the aircraft further comprises a cockpit for accommodating at least one pilot; and
    the entity is a man-portable device that can be operated within the cockpit by the pilot.

14. The system according to claim 12, wherein the entity is remote from the aircraft.

15. The system according to claim 12, wherein the entity is a computer selected from the group of computers consisting of a mobile communication device, a desktop personal computer, a laptop computer, a tablet computer, a mobile station, a wireless phone, a smartphone, a netbook, and dedicated aircraft computing hardware.

16. A data communication method comprising:
    providing an aircraft, the aircraft comprising an aircraft avionics system configured to perform one or more functions, and an interface module operatively coupled to the aircraft avionics system, the data communication method comprising, while the aircraft is in flight:

storing, on the aircraft, for each of the functions, respective one or more test criteria;

receiving, by the interface module, from an entity remote from the aircraft avionics system, a function request for the aircraft avionics system to perform a certain one of the functions;

testing, by the interface module, of the certain function against one or more of the stored test criteria corresponding to the certain function;

responsive to determining that the certain function satisfies all of the test criteria that correspond to the certain function, outputting, by the interface module, of the function request for use by the aircraft avionics system; and responsive to determining that the certain function does not satisfy at least one of the test criteria that correspond to the certain function, closing, by the interface module, of a communication link between the interface module and the entity remote from the aircraft avionics system.

17. The method of claim 16, wherein the method further includes:

receiving from the entity remote from the aircraft avionics system a request for data items;

acquiring the requested data items from the avionics system; and continuously streaming the requested data items to the entity remote from the aircraft avionics system at a requested rate until a request to stop is received from the entity remote from the avionics system.

18. A machine readable storage medium included in an interface module that is operatively coupled to an aircraft avionics system of an aircraft, the avionics system being configured to perform one or more functions, the storage medium containing non-transitory software instructions that are configured, while the aircraft is in flight, to cause the interface module to:

receive from an entity remote from the aircraft avionics system a function request for the aircraft avionics system to perform a certain one of the functions;

test the certain function against one or more stored test criteria corresponding to the certain function;

responsive to determining that the certain function satisfies all of the test criteria that correspond to the certain function, output the function request for use by the aircraft avionics system; and responsive to determining that the certain function does not satisfy at least one of the test criteria that correspond to the certain function, close a communication link between the interface module and the entity remote from the aircraft avionics system.

19. The storage medium of claim 18, wherein the non-transitory software instructions are configured to cause the interface module to:

receive from the entity remote from the aircraft avionics system a request for data items;

acquire the requested data items from the avionics system; and continuously stream the requested data items to the entity remote from the aircraft avionics system at a requested rate until a request to stop is received from the entity remote from the avionics system.

* * * * *